US006910011B1

(12) United States Patent
Zakarauskas

(10) Patent No.: US 6,910,011 B1
(45) Date of Patent: Jun. 21, 2005

(54) NOISY ACOUSTIC SIGNAL ENHANCEMENT

(75) Inventor: Pierre Zakarauskas, Vancouver (CA)

(73) Assignee: Haman Becker Automotive Systems - Wavemakers, Inc., Vancouver (CA)

( * ) Notice: Subject to any disclaimer, the term of this patent is extended or adjusted under 35 U.S.C. 154(b) by 0 days.

(21) Appl. No.: 09/375,309

(22) Filed: Aug. 16, 1999

(51) Int. Cl.[7] .......................... G10L 15/20; G10L 21/02

(52) U.S. Cl. ....................................... 704/233; 704/226

(58) Field of Search ................................ 704/201, 205, 704/226, 233; 381/94.1, 94.2

(56) References Cited

U.S. PATENT DOCUMENTS

| | | | | |
|---|---|---|---|---|
| 4,843,562 A | * | 6/1989 | Kenyon et al. | 702/73 |
| 5,027,410 A | * | 6/1991 | Williamson et al. | 381/320 |
| 5,313,555 A | | 5/1994 | Kamiya | |
| 5,502,688 A | | 3/1996 | Recchione et al. | |
| 5,680,508 A | * | 10/1997 | Liu | 704/227 |
| 5,933,801 A | * | 8/1999 | Fink et al. | 704/208 |
| 5,949,888 A | * | 9/1999 | Gupta et al. | 381/66 |
| 6,167,375 A | * | 12/2000 | Miseki et al. | 704/229 |

FOREIGN PATENT DOCUMENTS

| | | |
|---|---|---|
| EP | 0 629 996 A2 | 12/1994 |
| EP | 0 629 996 A3 | 12/1994 |
| EP | 0 750 291 A | 12/1996 |

OTHER PUBLICATIONS

Quatieri, T.F. et al, "Noise Reduciton Using a Soft–Decision Sine–Wave Vector Quantizer," IEEE International Conference on Acoustics, Speech & Signal Processing, Apr. 3, 1990, pp. 821–824, vol. 15.*

Quatieri, T. F. et al., Noise Reduction using a Soft–Detection Sine–Wave Vector Quantizer, International Conference on Acoutics, Speech & Signal Processing, Apr. 3, 1990, pp. 821–824, vol. Conf. 15, IEEE ICASSP, New York, US, XP000146895. abstract, paragraph 3.1!.

Zakarauskas, Pierre, *Detection and Localization of Nondeterministic Transients in Time Series and Application to Ice–Cracking Sound*, Digital Signal Processing, 3 (1993) Jan., No. 1, Orlando, Florida.

Quelavoine, R. et al., *Transients Recognition in Underwater Acoustic with Multilayer Neural Networks*, pp. 330–332.

Learned, R., et al. *A Wavelet Packet Approach to Transient Signal Classification*, Applied and Computational Harmonic Analysis 2, 265–278 (1995).

Simon, G., *Detection of Harmonic Burst Signals*, Circuit Theory and Applications, vol. 13, pp. 195–201 (1985).

* cited by examiner

*Primary Examiner*—Richemond Dorvil
*Assistant Examiner*—Angela Armstrong
(74) *Attorney, Agent, or Firm*—Brinks Hofer Gilson & Lione

(57) ABSTRACT

A system and method for enhancing acoustic signal buried in noise. The invention matches the acoustic input to a signal model and produces a corresponding output that has very low noise. Input data are digitized, transformed to a time-frequency representation, background noise is estimated, and transient sounds are isolated. A signal detector is applied to the transient. Long transients without signal content, and the background between the transients, are included in the noise estimate. If at least some part of the transient contains signal of interest, the spectrum of the signal is compared to the signal model after rescaling, and the signal's parameters are fitted to the data. If an existing template is found that resembles the input pattern, the template is averaged with the pattern in such a way that the resulting template is the average of all the spectra that matched that template in the past.

20 Claims, 4 Drawing Sheets

Speech enhancement

Background noise estimation and transient isolation

Pattern matching routine

NOISY ACOUSTIC SIGNAL ENHANCEMENT

TECHNICAL FIELD

This invention relates to systems and methods for enhancing the quality of an acoustic signal degraded by additive noise.

BACKGROUND

There are several fields of research studying acoustic signal enhancement, with the emphasis being on speech signals. Among those are: voice communication, automatic speech recognition (ASR), and hearing aids. Each field of research has adopted its own approaches to acoustic signal enhancement, with some overlap between them.

Acoustic signals are often degraded by the presence of noise. For example, in a busy office or a moving automobile, the performance of ASR systems degrades substantially. If voice is transmitted to a remote listener—as in a teleconferencing system—the presence of noise can be annoying or distracting to the listener, or even make the speech difficult to understand. People with a loss of hearing have notable difficulty understanding speech in noisy environment, and the overall gain applied to the signal by most current hearing aids does not help alleviate the problem. Old music recordings are often degraded by the presence of impulsive noise or hissing. Other examples of communication where acoustic signal degradation by noise occurs include telephony, radio communications, video-conferencing, computer recordings, etc.

Continuous speech large vocabulary ASR is particularly sensitive to noise interference, and the solution adopted by the industry so far has been the use of headset microphones. Noise reduction is obtained by the proximity of the microphone to the mouth of the subject (about one-half inch), and sometimes also by special proximity effect microphones. However, a user often finds it awkward to be tethered to a computer by the headset, and annoying to be wearing an obtrusive piece of equipment. The need to use a headset precludes impromptu human-machine interactions, and is a significant barrier to market penetration of ASR technology.

Apart from close-proximity microphones, traditional approaches to acoustic signal enhancement in communication have been adaptive filtering and spectral subtraction. In adaptive filtering, a second microphone samples the noise but not the signal. The noise is then subtracted from the signal. One problem with this approach is the cost of the second microphone, which needs to be placed at a different location from the one used to pick up the source of interest. Moreover, it is seldom possible to sample only the noise and not include the desired source signal. Another form of adaptive filtering applies bandpass digital filtering to the signal. The parameters of the filter are adapted so as to maximize the signal-to-noise ratio (SNR), with the noise spectrum averaged over long periods of time. This method has the disadvantage of leaving out the signal in the bands with low SNR.

In spectral subtraction, the spectrum of the noise is estimated during periods where the signal is absent, and then subtracted from the signal spectrum when the signal is present. However, this leads to the introduction of "musical noise" and other distortions that are unnatural. The origin of those problems is that, in regions of very low SNR, all that spectral subtraction can determine is that the signal is below a certain level. By being forced to make a choice of signal level based on sometimes poor evidence, a considerable departure from the true signal often occurs in the form of noise and distortion.

A recent approach to noise reduction has been the use of beamforming using an array of microphones. This technique requires specialized hardware, such as multiple microphones, A/D converters, etc., thus raising the cost of the system. Since the computational cost increases proportionally to the square of the number of microphones, that cost also can become prohibitive. Another limitation of microphone arrays is that some noise still leaks through the beamforming process. Moreover, actual array gains are usually much lower than those measured in anechoic conditions, or predicted from theory, because echoes and reverberation of interfering sound sources are still accepted through the mainlobe and sidelobes of the array.

The inventor has determined that it would be desirable to be able to enhance an acoustic signal without leaving out any part of the spectrum, introducing unnatural noise, or distorting the signal, and without the expense of microphone arrays. The present invention provides a system and method for acoustic signal enhancement that avoids the limitations of prior techniques.

SUMMARY

The invention includes a method, apparatus, and computer program to enhance the quality of an acoustic signal by processing an input signal in such a manner as to produce a corresponding output that has very low levels of noise ("signal" is used to mean a signal of interest; background and distracting sounds against which the signal is to be enhanced is referred to as "noise"). In the preferred embodiment, enhancement is accomplished by the use of a signal model augmented by learning. The input signal may represent human speech, but it should be recognized that the invention could be used to enhance any type of live or recorded acoustic data, such as musical instruments and bird or human singing.

The preferred embodiment of the invention enhances input signals as follows: An input signal is digitized into binary data which is transformed to a time-frequency representation. Background noise is estimated and transient sounds are isolated. A signal detector is applied to the transients. Long transients without signal content and the background noise between the transients are included in the noise estimate. If at least some part of a transient contains signal of interest, the spectrum of the signal is compared to the signal model after rescaling, and the signal's parameters are fitted to the data. Low-noise signal is resynthesized using the best fitting set of signal model parameters. Since the signal model only incorporates low noise signal, the output signal also has low noise. The signal model is trained with low-noise signal data by creating templates from the spectrograms when they are significantly different from existing templates. If an existing template is found that resembles the input pattern, the template is averaged with the pattern in such a way that the resulting template is the average of all the spectra that matched that template in the past. The knowledge of signal characteristics thus incorporated in the model serves to constrict the reconstruction of the signal, thereby avoiding introduction of unnatural noise or distortions.

The invention has the following advantages: it can output resynthesized signal data that is devoid of both impulsive and stationary noise, it needs only a single microphone as a source of input signals, and the output signal in regions of low SNR is kept consistent with those spectra the source could generate.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Throughout this description, the preferred embodiment and examples shown should be considered as exemplars rather than as limitations of the invention.

Overview of Operating Environment

Figure 1:
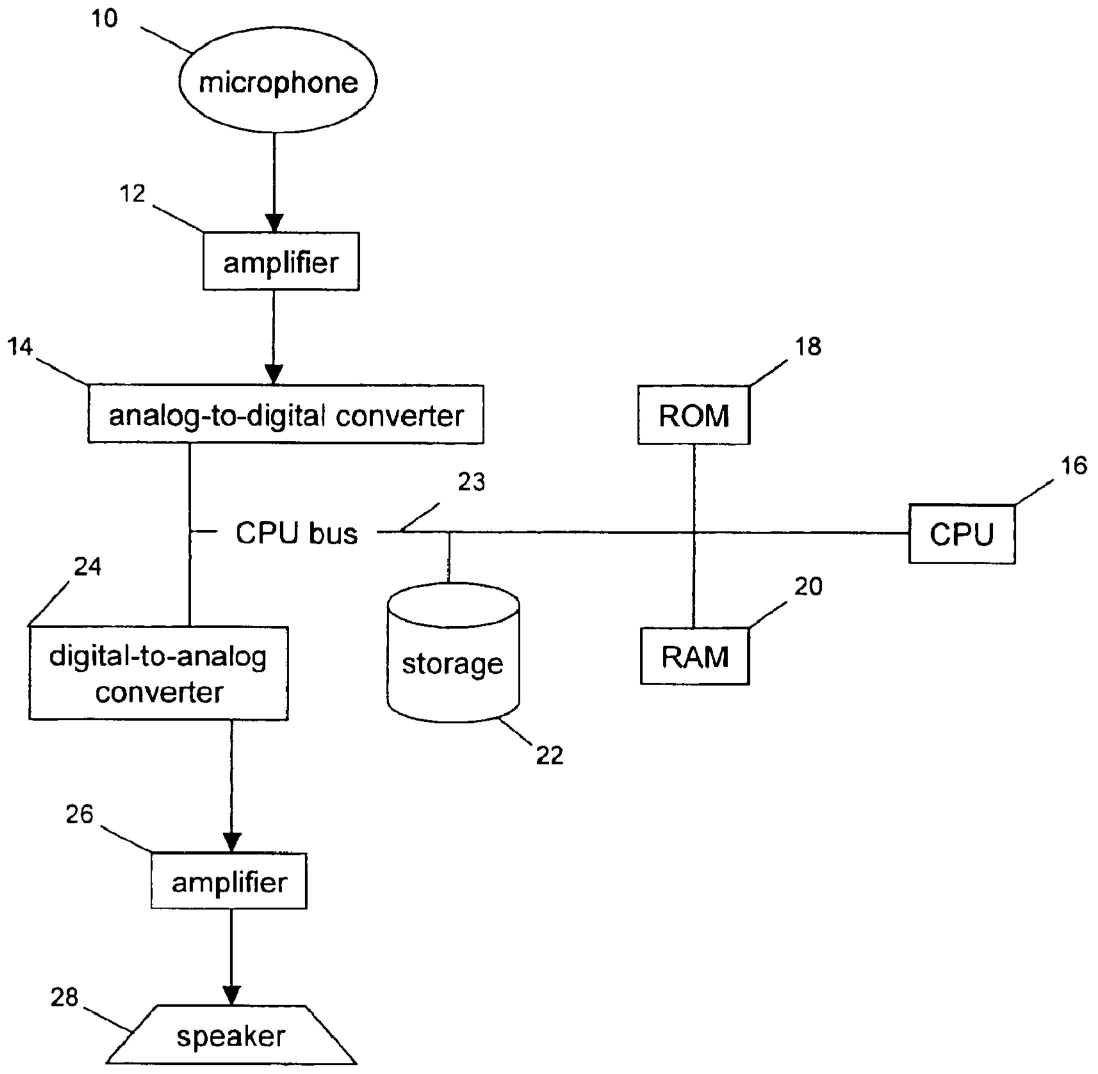
FIG. 1 Prior Art
FIG. 1 is block diagram of a prior art programmable computer system suitable for implementing the signal enhancement technique of the invention.

FIG. 1 shows a block diagram of a typical prior art programmable processing system which may be used for implementing the signal enhancement system of the invention. An acoustic signal is received at a transducer microphone 10, which generates a corresponding electrical signal representation of the acoustic signal. The signal from the transducer microphone 10 is then preferably amplified by an amplifier 12 before being digitized by an analog-to-digital converter 14. The output of the analog-to-digital converter 14 is applied to a processing system which applies the enhancement techniques of the invention. The processing system preferably includes a CPU 16, RAM 20, ROM 18 (which may be writable, such as a flash ROM), and an optional storage device 22, such as a magnetic disk, coupled by a CPU bus 23 as shown. The output of the enhancement process can be applied to other processing systems, such as an ASR system, or saved to a file, or played back for the benefit of a human listener. Playback is typically accomplished by converting the processed digital output stream into an analog signal by means of a digital-to-analog converter 24, and amplifying the analog signal with an output amplifier 26 which drives an audio speaker 28 (e.g., a loudspeaker, headphone, or earphone).

Functional Overview of System

The following describes the functional components of an acoustic signal enhancement system. A first functional component of the invention is a dynamic background noise estimator that transforms input data to a time-frequency representation. The noise estimator provides a means of estimating continuous or slowly-varying background noise causing signal degradation. The noise estimator should also be able to adapt to a sudden change in noise levels, such as when a source of noise is activated (e.g., an air-conditioning system coming on or off). The dynamic background noise estimation function is capable of separating transient sounds from background noise, and estimate the background noise alone. In one embodiment, a power detector acts in each of multiple frequency bands. Noise-only portions of the data are used to generate mean and standard-deviation of the noise in decibels (dB). When the power exceeds the mean by more than a specified number of standard deviations in a frequency band, the corresponding time period is flagged as containing signal and is not used to estimate the noise-only spectrum.

The dynamic background noise estimator works closely with a second functional component, a transient detector. A transient occurs when acoustic power rises and then falls again within a relatively short period of time. Transients can be speech utterances, but can also be transient noises, such as banging, door slamming, etc. Isolation of transients allow them to be studied separately and classified into signal and non-signal events. Also, it is useful to recognize when a rise in power level is permanent, such as when a new source of noise is turned on. This allows the system to adapt to that new noise level.

The third functional component of the invention is a signal detector. A signal detector is useful to discriminate non-signal non-stationary noise. In the case of harmonic sounds, it is also used to provide a pitch estimate if it is desired that a human listener listens to the reconstructed signal. A preferred embodiment of a signal detector that detects voice in the presence of noise is described below. The voice detector uses glottal pulse detection in the frequency domain. A spectrogram of the data is produced (temporal-frequency representation of the signal) and, after taking the logarithm of the spectrum, the signal is summed along the time axis up to a frequency threshold. A high autocorrelation of the resulting time series is indicative of voiced speech. The pitch of the voice is the lag for which the autocorrelation is maximum.

The fourth functional component is a spectral rescaler. The input signal can be weak or strong, close or far. Before measured spectra are matched against templates in a model, the measured spectra is rescaled so that the inter-pattern distance does not depend on the overall loudness of the signal. In the preferred embodiment, weighting is proportional to the SNR in decibels (dB). The weights are bounded below and above by a minimum and a maximum value, respectively. The spectra are rescaled so that the weighted distance to each stored template is minimum.

The fifth functional component is a pattern matcher. The distance between templates and the measured spectrogram can be one of several appropriate metrics, such as the Euclidian distance or a weighted Euclidian distance. The template with the smallest distance to the measured spectrogram is selected as the best fitting prototype. The signal model consists of a set of prototypical spectrograms of short duration obtained from low-noise signal. Signal model training is accomplished by collecting spectrograms that are significantly different from prototypes previously collected. The first prototype is the first signal spectrogram containing signal significantly above the noise. For subsequent time epochs, if the spectrogram is closer to any existing prototype than a selected distance threshold, then the spectrogram is averaged with the closest prototype. If the spectrogram is farther away from any prototype than the selected threshold, then the spectrogram is declared to be a new prototype.

The sixth functional component is a low-noise spectrogram generator. A low-noise spectrogram is generated from a noisy spectrogram generated by the pattern matcher by replacing data in the low SNR spectrogram bins with the value of the best fitting prototype. In the high SNR spectrogram bins, the measured spectra are left unchanged. A blend of prototype and measured signal is used in the intermediate SNR cases.

The seventh functional component is a resynthesizer. An output signal is resynthesized from the low-noise spectrogram. A preferred embodiment proceeds as follows. The signal is divided into harmonic and non-harmonic parts. For the harmonic part, an arbitrary initial phase is selected for each component. Then, for each point of non-zero output, the amplitude of each component is interpolated from the spectrogram, and the fundamental frequency is interpolated from the output of the signal detector. Each component is synthesized separately, each with a continuous phase, amplitude, and an harmonic relationship between their frequencies. The output of the harmonic part is the sum of the components.

For the non-harmonic part of the signal, the fundamental frequency of the resynthesized time series does not need to track the signal's fundamental frequency. In one embodiment, a continuous-amplitude and phase reconstruction is performed as for the harmonic part, except that the fundamental frequency is held constant. In another embodiment, noise generators are used, one for each frequency band of the signal, and the amplitude is tracking that of the low-noise spectrogram through interpolation. In yet another embodiment, constant amplitude windows of band-passed noise are added after their overall amplitude is adjusted to that of the spectrogram at that point.

Overview of Basic Method

Figure 2:
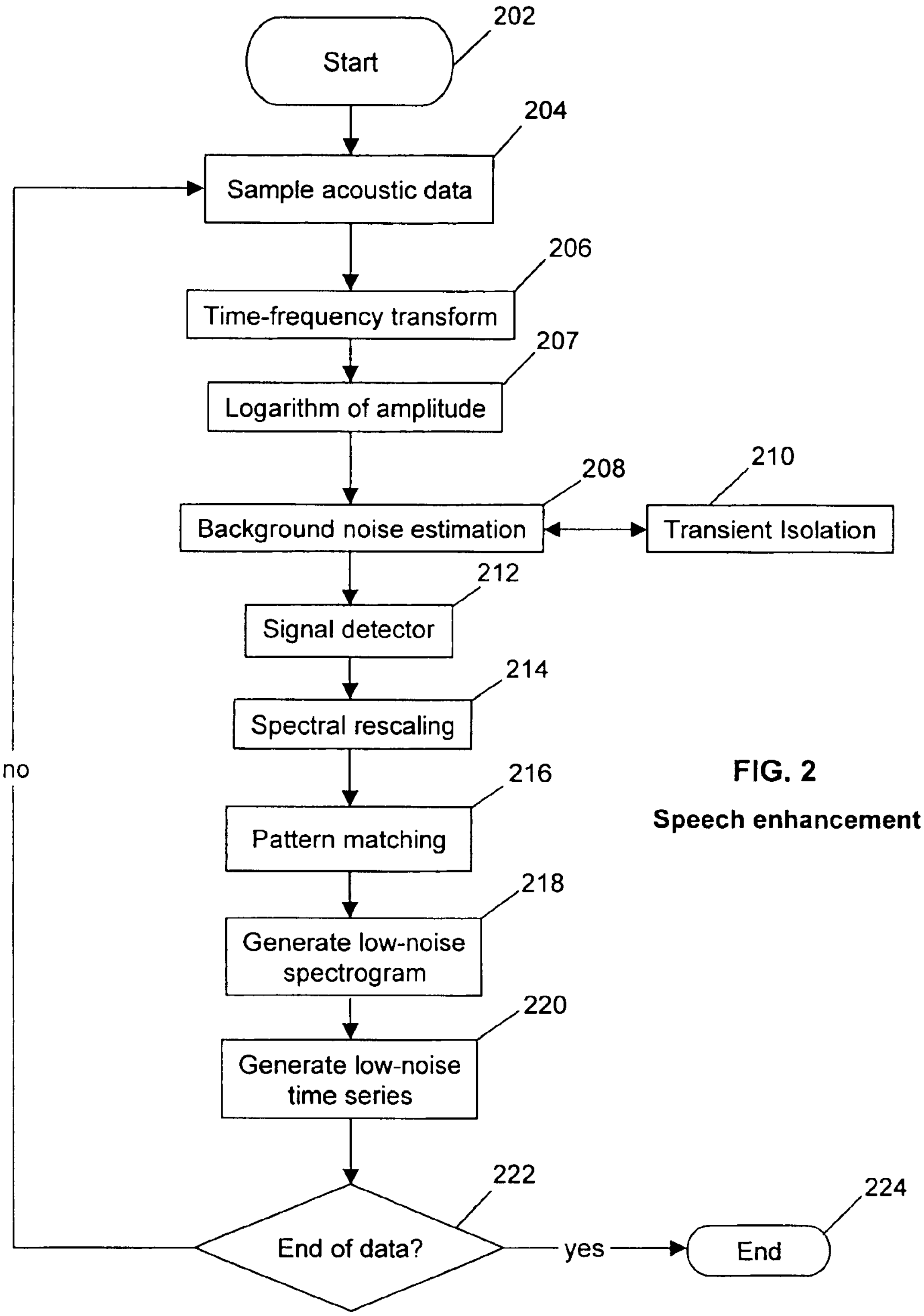
FIG. 2 is a flow diagram showing the basic method of the preferred embodiment of the invention.

FIG. 2 is a flow diagram of the a preferred method embodiment of the invention. The method shown in FIG. 2 is used for enhancing an incoming acoustic signal, which consists of a plurality of data samples generated as output from the analog-to-digital converter 14 shown in FIG. 1. The method begins at a Start state (Step 202). The incoming data stream (e.g. a previously generated acoustic data file or a digitized live acoustic signal) is read into a computer memory as a set of samples (Step 204). In the preferred embodiment, the invention normally would be applied to enhance a "moving window" of data representing portions of a continuous acoustic data stream, such that the entire data stream is processed. Generally, an acoustic data stream to be enhanced is represented as a series of data "buffers" of fixed length, regardless of the duration of the original acoustic data stream.

The samples of a current window are subjected to a time-frequency transformation, which may include appropriate conditioning operations, such as pre-filtering, shading, etc. (Step 206). Any of several time-frequency transformations can be used, such as the short-time Fourier transform, bank of filter analysis, discrete wavelet transform, etc.

The result of the time-frequency transformation is that the initial time series x(t) is transformed into a time-frequency representation X(f, i), where t is the sampling index to the time series x, and f and i are discrete variables respectively indexing the frequency and time dimensions of spectrogram X. In the preferred embodiment, the logarithm of the magnitude of X is used instead of X (Step 207) in subsequent steps unless specified otherwise, i.e.:

$$P(f, i) = 20 \log_{10}(|X(f, i)|).$$

The power level P(f,i) as a function of time and frequency will be referred to as the "spectrogram" from now on.

The power levels in individual bands f are then subjected to background noise estimation (Step 208) coupled with transient isolation (Step 210). Transient isolation detects the presence of transient signals buried in stationary noise and outputs estimated starting and ending times for such transients. Transients can be instances of the sought signal, but can also be impulsive noise. The background noise estimation updates the estimate of the background noise parameters between transients.

A preferred embodiment for performing background noise estimation comprises a power detector that averages the acoustic power in a sliding window for each frequency band f. When the power within a predetermined number of frequency bands exceeds a threshold determined as a certain number of standard deviation above the background noise, the power detector declares the presence of a signal, i.e., when:

$$P(f, i) > B(f) + c\sigma(f),$$

where B(f) is the mean background noise power in band f, σ(f) is the standard deviation of the noise in that same band, and c is a constant. In an alternative embodiment, noise estimation need not be dynamic, but could be measured once (for example, during boot-up of a computer running software implementing the invention).

The transformed data that is passed through the transient detector is then applied to a signal detector function (Step 212). This step allows the system to discriminate against transient noises that are not of the same class as the signal. For speech enhancement, a voice detector is applied at this step. In particular, in the preferred voice detector, the level P(f, i) is summed along the time axis between a minimum and a maximum frequency lowf and topf, $$b(i) = \sum_{f=lowf}^{topf} P(f, i)$$

respectively.

Next, the autocorrelation of b(i) is calculated as a function of the time lag τ, for $\tau_{maxpitch} \leqq \tau \leqq \tau_{minpitch}$, where $\tau_{maxpitch}$ is the lag corresponding to the maximum voice pitch allowed, while $\tau_{minpitch}$ is the lag corresponding to the minimum voice pitch allowed. The statistic on which the voice/unvoiced decision is based is the value of the normalized autocorrelation (autocorrelation coefficient) of b(i), calculated in a window centered at time period i. If the maximum normalized autocorrelation is greater than a threshold, it is deemed to contain voice. This method exploits the pulsing nature of the human voice, characterized by glottal pulses appearing in the short-time spectrogram. Those glottal pulses line up along the frequency dimension of the spectrogram. If the voice dominates at least some region of the frequency domain, then the autocorrelation of the sum will exhibit a maximum at the value of the pitch period corresponding to the voice. The advantage of this voice detection method is that it is robust to noise interference over large portions of the spectrum, since it is only necessary to have good SNR over portion of the spectrum for the autocorrelation coefficient of b(i) to be high.

Another embodiment of the voice detector weights the spectrogram elements before summing them in order to decrease the contribution of the frequency bins with low SNR, i.e.:

$$b(i) = \sum_{f=lowf}^{topf} P(f, i)w'(f, i).$$

The weights w(i) are proportional to the SNR r(f, i) in band f at time i, calculated as a difference of levels, i.e. r(f, i)=P(f, i)−B(f) for each frequency band. In this embodiment, each element of the rescaling factor is weighted by a weight defined as follows, where $w_{min}$ and $w_{max}$ are preset thresholds:

$$w(f, i) = w_{min} \text{ if } r(f, i) < w_{min};$$

$$w(f, i) = w_{max} \text{ if } r(f, i) > w_{max};$$

$$w(f, i) = r(f, i) \text{ otherwise,}$$

In the preferred embodiment, the weights are normalized by the sum of the weights at each time frame, i.e.:

$$w'(f, i)=w(f, i)/\text{sum}_f(w(f, i)),$$

$$w'_{min}=w_{min}/\text{sum}_f(w(f, i),$$

$$w'_{max}=w_{max}/\text{sum}_f(w(f, i)).$$

The spectrograms P from Steps 208 and 210 are preferably then rescaled so that they can be compared to stored templates (Step 214). One method of performing this step is to shift each element of the spectrogram P(f, i) up by a constant k(i, m) so that the root-mean-squared difference between P(f, i)+k(i, m) and the $m^{th}$ template T(f, m) is minimized. This is accomplished by taking the following, where N is the number of frequency bands:

$$k(i, m) = \frac{1}{N}\sum_{f=1}^{N}[P(f, i) - T(f, m)]$$

In another embodiment, weighting is used in the rescaling of the templates prior to comparison:

$$k(i, m) = \frac{1}{N}\sum_{f=1}^{N}[P(f, i) - T(f, m)]w'(f, i)$$

The effect of such resealing is to align preferentially the frequency bands of the templates having a higher SNR. However, resealing is optional and need not be used in all embodiments.

In another embodiment, the SNR of the templates is used as well as the SNR of the measured spectra for the rescaling of the templates. The SNR of template T(f, m) is defined as $r_N(f, m)=T(f, m)-B_N(f)$, where $B_N(f)$ is the background noise in frequency band f at the time of training. In one embodiment of a weighting scheme using both r and $r_N$, the weights $w_N$ are defined as the square-root of the product of the weights for the templates and the spectrogram:

$$w_2(f,i,m)=w_{min} \text{ if } \sqrt{r_{N(f,m)r(f,i)}}<w_{min};$$

$$w_2(f,i,m)=w_{max} \text{ if } \sqrt{r_{N(f,m)r(f,i)}}>w_{max};$$

$$w_2(f,i,m)=\sqrt{r_{N(f,m)r(f,i)}}>w_{max} \text{ otherwise.}$$

Other combinations of $r_N$ and r are admissible. In the preferred embodiment, the weights are normalized by the sum of the weights at each time frame, i.e.:

$$w'_2(f, i)=w_2(r, i)/\text{sum}_f(w_2(f, i)),$$

$$w'_{min}=w_{min}/\text{sum}_f(w_2(f, i)),$$

$$w'_{max}=w_{max}/\text{sum}_f(w_2(f, i)).$$

After spectral rescaling, the preferred embodiment performs pattern matching to find a template T* in the signal model that best matches the current spectrogram P(f, i) (Step 216). There exists some latitude in the definition of the term "best match", as well as in the method used to find that best match. In one embodiment, the template with the smallest r.m.s. (root mean square) difference d* between P+k and T* is found. In the preferred embodiment, the weighted r.m.s. distance is used, where:

$$d(i, m) = \frac{1}{N}\sum_{f=1}^{N}[P(f, i) + k(i, m) - T(f, m)]^2 w'_2(f, i, m)$$

In this embodiment, the frequency bands with the least SNR contribute less to the distance calculation than those bands with more SNR. The best matching template T*(i) at time i is selected by finding m such that $d^*(i)=\min_m(d(i,m))$.

Next, a low-noise spectrogram C is generated by merging the selected closest template T* with the measured spectrogram P (Step 218). For each window position i, a low-noise spectrogram C is reconstructed from P and T*. In the preferred embodiment, the reconstruction takes place the following way. For each time-frequency bin:

$$C(f, i)=w'2(f, i)P(f, i)+[w'_{max}-w'_2(f, i)]T^*(f, i).$$

After generating a low-noise spectrogram C, a low-noise output time series y is synthesized (Step 220). In the preferred embodiment, the spectrogram is divided into harmonic ($y_h$) and non-harmonic ($y_u$) parts and each part is reconstructed separately (ie., $y=y_h+y_u$). The harmonic part is synthesized using a series of harmonics c(t,f). An arbitrary initial phase $\phi_0(f)$ is selected for each component f. Then for each output point $y_h(t)$ the amplitude of each component is interpolated from the spectrogram C, and the fundamental frequency $f_0$ is interpolated from the output of the voice detector. The components c(t, j) are synthesized separately, each with a continuous phase, amplitude, and a common pitch relationship with the other components:

$$c(t,j)=A(t,j)\sin[f_0 j\, t+\phi_0(f)],$$

where A(t, j) is the amplitude of each harmonic j at time t. One embodiment uses spline interpolation to generate continuous values of $f_0$ and A(t, j) that vary smoothly between spectrogram points.

The harmonic part of the output is the sum of the components, $y_h(t)=\text{sum}_j[c(t, j)]$. For the non-harmonic part of the signal $y_u$, the fundamental frequency does not need to track the signal's fundamental frequency. In one embodiment, a continuous-amplitude and phase reconstruction is performed as for the harmonic part, except that $f_0$ is held constant. In another embodiment, a noise generator is used, one for each frequency band of the signal, and the amplitude is made to track that of the low-noise spectrogram.

If any of the input data remains to be processed (Step 222), then the entire process is repeated on a next sample of acoustic data (Step 204). Otherwise, processing ends (Step 224). The final output is a low-noise signal that represents an enhancement of the quality of the original input acoustic signal.

Background Noise Estimation and Transient Isolation

Figure 3:
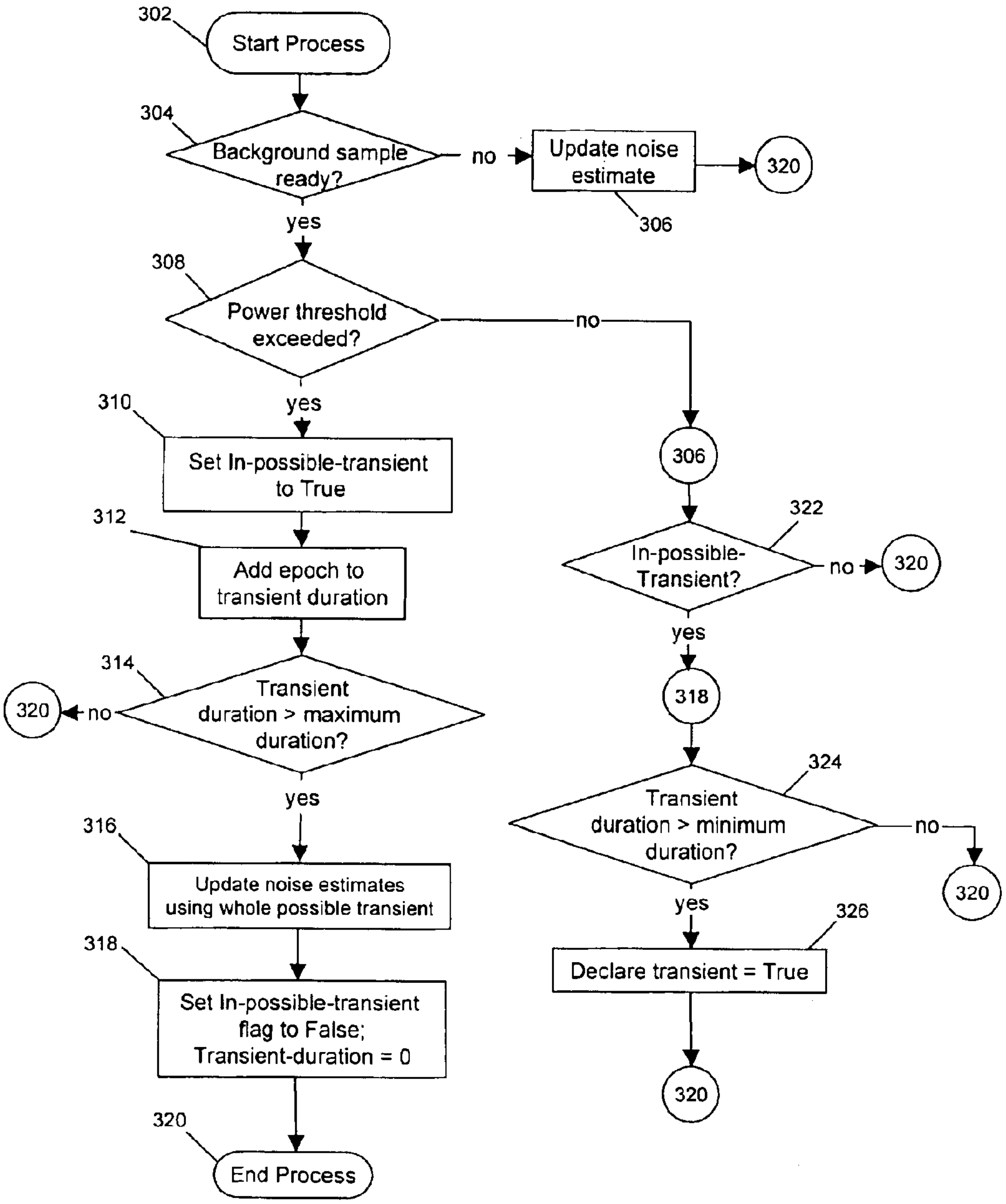
FIG. 3 is a flow diagram showing a preferred process for detecting and isolating transients in input data and estimating background noise parameters.

FIG. 3 is a flow diagram providing a more detailed description of the process of background noise estimation and transient detection which were briefly described as Steps 212 and 208, respectively, in FIG. 2. The transient isolation process detects the presence of transient signal buried in stationary noise. The background noise estimator updates the estimates of the background noise parameters between transients.

The process begins at a Start Process state (Step 302). The process needs a sufficient number of samples of background noise before it can use the mean and standard deviation of the noise to detect transients. Accordingly, the routine determines if a sufficient number of samples of background noise have been obtained (Step 304). If not, the present sample is used to update the noise estimate (Step 306)and the process is terminated (Step 320). In one embodiment of the background noise update process, the spectrogram elements P(f, i) are kept in a ring buffer and used to update the mean B(f) and the standard deviation σ(f) of the noise in each frequency band f. The background noise estimate is considered ready when the index i is greater than a preset threshold.

If the background samples are ready (Step 304), then a determination is made as to whether the signal level P(f, i) is significantly above the background in some of the frequency bands (Step 308). In a preferred embodiment, when the power within a predetermined number of frequency bands is greater than a threshold determined as a certain number of standard deviations above the background noise mean level, the determination step indicates that the power threshold has been exceeded, i e., when $$P(f,i)>B(f)+c\sigma(f),$$

where c is a constant predetermined empirically. Processing then continues at Step 310.

In order to determine if the spectrogram P(f, i) contains a transient signal, a flag "In-possible-transient" is set to True (Step 310), and the duration of the possible transient is incremented (Step 312). A determination is made as to whether the possible transient is too long to be a transient or not (Step 314). If the possible transient duration is still within the maximum duration, then the process is terminated (Step 320). On the other hand, if the transient duration is judged too long to be a spoken utterance, then it is deemed to be an increase in background noise level. Hence, the noise estimate is updated retroactively (Step 316), the "In-possible-transient" flag is set to False and the transient-duration is reset to 0 (Step 318), and processing terminates (Step 320).

If a sufficiently powerful signal is not detected in Step 308, then the background noise statistics are updated as in Step 306. After that, the "In-possible-transient" flag is tested (Step 322). If the flag it is set to False, then the process ends (Step 320). If the flag is set to True, then it is reset to False and the transient-duration is reset to 0, as in Step 318. The transient is then tested for duration (Step 324). If the transient is deemed too short to be part of a speech utterance, the process ends (Step 320). If the transient is long enough to be a possible speech utterance, then the transient flag is set to True, and the beginning and end of the transient are passed up to the calling routine (Step 326). The process then ends (Step 320).

Pattern Matching

Figure 4:
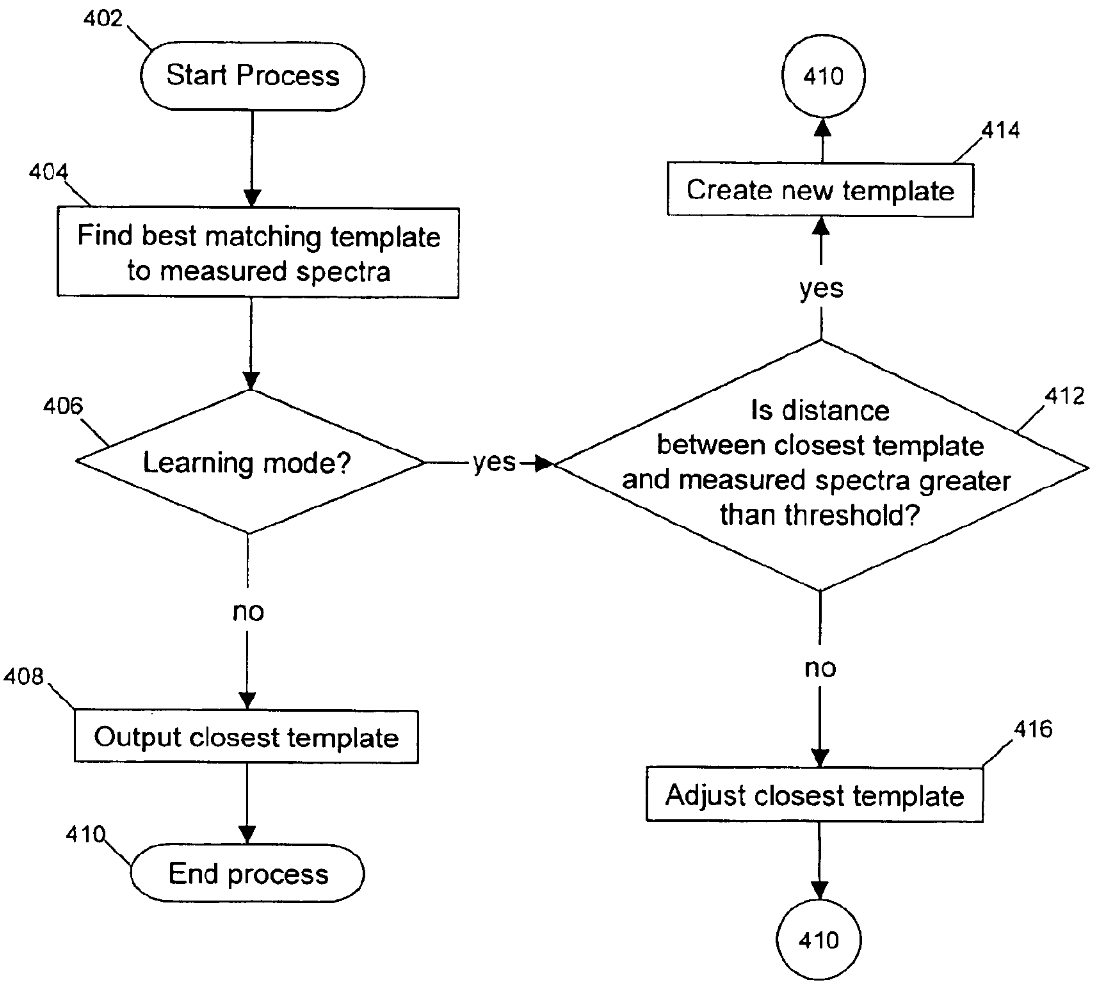
FIG. 4 is a flow diagram showing a preferred method for generating and using the signal model templates.

FIG. 4 is a flow diagram providing a more detailed description of the process of pattern matching which was briefly described as Step 216 of FIG. 2. The process begins at a Start Process state (Step 402). The pattern matching process finds a template T* in the signal model that best matches the considered spectrogram P(f, i) (Step 404). The pattern matching process is also responsible for the learning process of the signal model. There exists some latitude in the definition of the term "best match", as well as in the method used to find that best match. In one embodiment, the template with the smallest r.m.s. difference d* between P+k and T* is found. In the preferred embodiment, the weighted r.m.s. distance is used to measure the degree of match. In one embodiment, the r.m.s. distance is calculated by:

$$d(i,m)=\frac{1}{N}\sum_{f=1}^{N}[P(f,i)+k(i,m)-T(f,m)]^2 w_2^2(f,i,m)$$

In this embodiment, the frequency bands with the least SNR contribute less to the distance calculation than those bands with more SNR. The best matching template T*(f, i) that is the output of Step 404 at time i is selected by finding m such that $d^*(i)=\min_m[d(i,m)]$. If the system is not in learning mode (Step 406), then T*(f, i) is also the output of the process as being the closest template (Step 408). The process then ends (Step 410).

If the system is in learning mode (Step 406), the template T*(f, i) most similar to P(f, i) is used to adjust the signal model. The manner in which T*(f, i) is incorporated in the model depends on the value of d*(i) (Step 412). If $d^*(i)<d_{max}$, where $d_{max}$ is a predetermined threshold, then T*(f, i) is adjusted (Step 416), and the process ends (Step 410). The preferred embodiment of Step 416 is implemented such that T*(f, i) is the average of all spectra P(f, i) that are used to compose T*(f, i). In the preferred embodiment, the number $n_m$ of spectra associated with T(f, m) is kept in memory, and when a new spectrum P(f, i) is used to adjust T(f, m), the adjusted template is:

$$T(f,m)=[n_m T(f,m)+P(f,i)]/(n_m+1),$$

and the number of patterns corresponding to template m is adjusted as well:

$$n_m=n_m+1.$$

Going back to Step 412, if $d^*(i)>d_{max}$, then a new template is created (Step 414), T*(f, i)=P(f, i), with a weight $n_m=1$, and the process ends (Step 410).

Computer Implementation

The invention may be implemented in hardware or software, or a combination of both (e.g., programmable logic arrays). Unless otherwise specified, the algorithms included as part of the invention are not inherently related to any particular computer or other apparatus. In particular, various general purpose machines may be used with programs written in accordance with the teachings herein, or it may be more convenient to construct more specialized apparatus to perform the required method steps. However, preferably, the invention is implemented in one or more computer programs executing on programmable systems each comprising at least one processor, at least one data storage system (including volatile and non-volatile memory and/or storage elements), at least one input device, and at least one output device. Each such programmable system component constitutes a means for performing a function. The program code is executed on the processors to perform the functions described herein.

Each such program may be implemented in any desired computer language (including machine, assembly, high level procedural, or object oriented programming languages) to communicate with a computer system. In any case, the language may be a compiled or interpreted language.

Each such computer program is preferably stored on a storage media or device (e.g., ROM, CD-ROM, or magnetic or optical media) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the invention have been described. Nevertheless, it will be understood that various modifications may be made without departing from the spirit and scope of the invention. For example, some of the steps of various of the algorithms may be order independent, and thus may be executed in an order other than as described above. Accordingly, other embodiments are within the scope of the following claims.

What is claimed is:

1. A method for enhancing acoustic signal buried in noise within a digitized acoustic input signal, including:

(a) transforming the digitized acoustic input signal to a time-frequency representation;

(b) detecting transient duration in conjunction with estimating a background noise level in the time-frequency representation;

(c) for each interval of the time-frequency representation containing significant signal levels, performing a signal-to-noise ratio weighted comparison of the time-frequency representation of such interval against a plurality of time-frequency spectrogram templates in a signal model and determining a matching spectrogram template in the signal model that best matches the time-frequency representation of such interval; and (d) replacing the digitized acoustic input signal with a low-noise output signal comprising a signal-to-noise ratio weighted mix of the time-frequency representation and the matching spectrogram template.

2. The method of claim 1, where the low-noise output signal comprises a low-noise spectrogram.

3. The method of claim 2, further comprising synthesizing a time series output from the low-noise spectrogram.

4. The method of claim 1, where the signal-to-noise ratio weighted mix, C, is determined according to:

$$C=w*P+(wmax-w)*T,$$

where 'w' comprises a signal-to-noise ratio proportional weight, 'wmax' comprises a pre-selected maximum weight, 'P' comprises the time-frequency representation, and 'T' comprises the matching spectrogram template.

5. A system for enhancing acoustic signal buried in noise within a digitized acoustic input signal, including:

(a) means for transforming the digitized acoustic input signal to a time-frequency representation;

(b) means for detecting transient duration in conjunction with estimating a background noise level in the time-frequency representation;

(c) for each interval of the time-frequency representation containing significant signal levels, means for performing a signal-to-noise ratio weighted comparison of the time-frequency representation of such interval against a plurality of time-frequency spectrogram templates in a signal model and determining a matching spectrogram template in the signal model that best matches the time-frequency representation of such interval; and (d) means for replacing the digitized acoustic input signal with a low-noise output signal comprising a signal-to-noise ratio weighted mix of the time-frequency representation and the matching spectrogram template.

6. The system of claim 5, where the low-noise output signal comprises a low-noise spectrogram, and further comprising means for synthesizing a time series output as a sum of a harmonic part and a non-harmonic part derived from the low-noise spectrogram.

7. The system of claim 5, where the signal-to-noise ratio weighted mix, C, is determined according to:

$$C=w*P+(wmax-w)*T,$$

where 'w' comprises a signal-to-noise ratio proportional weight, 'wmax' comprises a pre-selected maximum weight, 'P' comprises the time-frequency representation, and 'T' comprises the matching spectrogram template.

8. A computer program, stored on a computer-readable medium, for enhancing acoustic signal buried in noise within a digitized acoustic input signal, the computer program comprising instructions for causing a computer to:

(a) transform the digitized acoustic input signal to a time-frequency representation;

(b) detect transient duration in conjunction with estimating a background noise level in the time-frequency representation;

(c) for each interval of the time-frequency representation containing significant signal levels, perform a signal-to-noise ratio weighted comparison of the time-frequency representation of such interval against a plurality of time-frequency spectrogram templates in a signal model and determine a matching spectrogram template in the signal model that best matches the time-frequency representation of such interval; and (d) replace the digitized acoustic input signal with a low-noise output signal comprising a signal-to-noise ratio weighted mix of the time-frequency representation and the matching spectrogram template.

9. The computer-readable medium of claim 8, where the low-noise output signal comprises a low-noise spectrogram, and where the instructions further cause the computer to synthesize a time series output from the low-noise spectrogram.

10. The computer-readable medium of claim 8, where the signal-to-noise ratio weighted mix, C, is determined according to:

$$C=w*P+(wmax-w)*T,$$

where 'w' comprises a signal-to-noise ratio proportional weight, 'wmax' comprises a pre-selected maximum weight, 'P' comprises the time-frequency representation, and 'T' comprises the matching spectrogram template.

11. A method for enhancing acoustic signal buried in noise within a digitized acoustic input signal, including:

(a) transforming the digitized acoustic input signal to a time-frequency representation;

(b) detecting transient duration in conjunction with estimating background noise and including long transients without signal content and background noise between transients in such estimating;

determining signal strength in the time-frequency representation;

updating a background noise statistic based on the time-frequency representation when the signal strength is under a pre-selected threshold;

(c) performing a signal-to-noise ratio weighted comparison, when the signal strength is greater than the pre-selected threshold, of the time-frequency representation against a plurality of time-frequency spectrogram templates in a signal model;

(d) determining a matching spectrogram template in the signal model that best matches such representation; and (e) replacing the digitized acoustic input signal with a low-noise output signal comprising a signal-to-noise ratio weighted mix of the time-frequency representation and the matching spectrogram template.

12. The method of claim 11, where the low-noise output signal comprises a low-noise spectrogram.

13. The method of claim 12, further comprising synthesizing a time series output from the low-noise spectrogram.

14. The method of claim 11, where the signal-to-noise ratio weighted mix, C, is determined according to:

$$C=w*P+(wmax-w)*T,$$

where 'w' comprises a signal-to-noise ratio proportional weight, 'wmax' comprises a pre-selected maximum weight, 'P' comprises the time-frequency representation, and 'T' comprises the matching spectrogram template.

15. A system for enhancing acoustic signal buried in noise within a digitized acoustic input signal, including:

(a) means for transforming the digitized acoustic input signal to a time-frequency representation;

(b) means for detecting transient duration in conjunction with estimating background noise and including long transients without signal content and background noise between transients in such estimating;

(c) means for determining signal strength in the time-frequency representation;

(d) means for updating a background noise statistic based on the time-frequency representation when the signal strength is under a pre-selected threshold;

(e) means for performing a signal-to-noise ratio weighted comparison, when the signal strength is greater than the pre-selected threshold, of the time-frequency representation against a plurality of time-frequency spectrogram templates in a signal model;

(f) means for determining a matching spectrogram template in the signal model that best matches such representation; and (g) means for replacing the digitized acoustic input signal with a low-noise output signal comprising a signal-to-noise ratio weighted mix of the time-frequency representation and the matching spectrogram template.

16. The system of claim 15, where the low-noise output signal is a low-noise spectrogram, and further comprising means for synthesizing a time series output from the low-noise spectrogram.

17. The system of claim 15, where the signal-to-noise ratio weighted mix, C, is determined according to:

$$C=w*P+(wmax-w)*T,$$

where 'w' comprises a signal-to-noise ratio proportional weight, 'wmax' comprises a pre-selected maximum weight, 'P' comprises the time-frequency representation, and 'T' comprises the matching spectrogram template.

18. A computer program, stored on a computer-readable medium, for enhancing acoustic signal buried in noise within a digitized acoustic input signal, the computer program comprising instructions for causing a computer to:

(a) transform the digitized acoustic input signal to a time-frequency representation;

(b) detect transient duration in conjunction with estimating background noise and including long transients without signal content and background noise between transients in such estimating;

determine signal strength in the time-frequency representation;

update a background noise statistic based on the time-frequency representation, when the signal strength is under a pre-selected threshold;

(c) rescale the time-frequency representation of the estimated background noise;

(d) perform a signal-to-noise ratio weighted comparison, when the signal strength is greater than the pre-selected threshold, of the time-frequency representation against a plurality of time-frequency spectrogram templates in a signal model;

(e) determine a matching spectrogram template in the signal model that best matches such representation; and (f) replace the digitized acoustic input signal with a low-noise output signal comprising a signal-to-noise ratio weighted mix of the time-frequency representation and the matching spectrogram template.

19. The computer-readable medium of claim 18, where the low-noise output signal comprises a low-noise spectrogram, and where the instructions further cause the computer to synthesize a time series output from the low-noise spectrogram.

20. The computer-readable medium of claim 18, where the signal-to-noise ratio weighted mix, C, is determined according to:

$$C=x*P+(wmax-w)*T,$$

where 'w' comprises a signal-to-noise ratio proportional weight, 'wmax' comprises e pre-selected maximum weight, 'P' comprises the time-frequency representation and 'T' comprises the matching spectrogram template.

* * * * *